June 13, 1950 — O. K. ELDREDGE — 2,511,701
LINE DRYING REEL
Filed Aug. 14, 1946
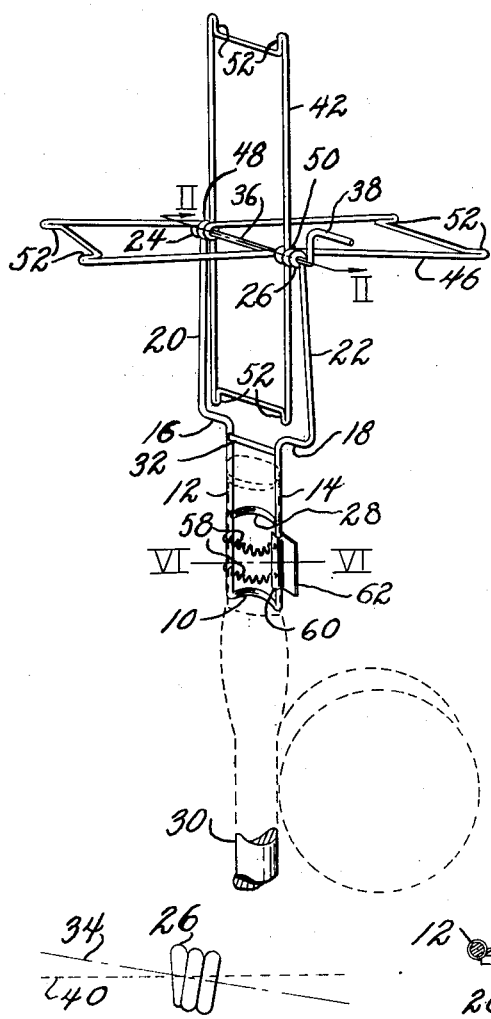
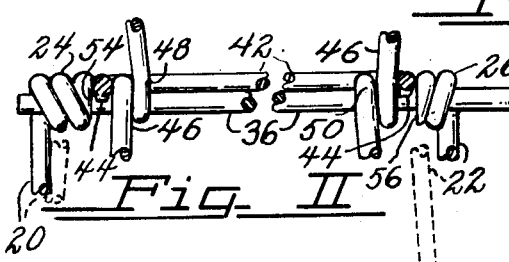
Ormond K. Eldredge
INVENTOR.
BY
Wm. Q. Ballard Patented June 13, 1950

2,511,701

UNITED STATES PATENT OFFICE 2,511,701

LINE DRYING REEL

Ormond K. Eldredge, Adrian, Mich.

Application August 14, 1946, Serial No. 690,420

2 Claims. (Cl. 242—104)

This invention relates to a portable line drying reel and is more particularly adapted to be attached to a fishing rod for receiving wet line directly from a fishing reel mounted on the rod.

An object of the invention is to provide a collapsible device which folds into a substantially flat arrangement easily carried in a pocket or kit and occupying a minimum of space.

An additional object of the invention is to provide a satisfactory drying reel entirely constructed of low cost materials, mostly inexpensive wire.

Another object of the invention is to provide a reel which will remain in set-up position under normal operation, the means employed being the cooperation of the pre-shaped parts in assembly.

Still another object of the invention is to provide a portable reel which may be easily attached or detached to a fishing rod or other device and also being adaptable for manual holding during a reeling operation.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of the specification wherein like reference characters designate corresponding parts in the several views.

Referring to the drawings:

Fig. I is a perspective view of the line drying reel in set-up or in-use position in relation to a fishing rod;

Fig. II is a view on the line II—II, Fig. I;

Fig. III is a side elevation of the device in collapsed or storage position;

Fig. IV is a schematic plan view of one of the termini of the main frame illustrating the angular movement between the free position thereof to assembly position for maintaining a shaft mounted therein against too free rotation;

Fig. V is a plan view of one of the reel parts showing one pair of its sides squeezed toward each other as in assembled position; and Fig. VI is a view on the line VI—VI, Fig. I.

The device herein comprises a main frame formed from a continuous length of wire to provide an arcuate-shaped base or terminal portion 10 having arms 12, 14, extending therefrom to offsets 16, 18, having extensions 20, 22, therefrom each terminating in a series of convolutions 24, 26.

The portions 10, 12, 14, serve as a handle by which the device may be manually held in use or in conjunction with an arcuate reinforcement 28 intermediate the arms length, the device may be mounted on some other device, for as example, a fishing rod 30. One or more additional reinforcements 32 may be welded to the arms and bridge the space therebetween.

In the shaping of this main frame, the arms 20, 22, converge toward each other from the offsets 16, 18 (Fig. II), and the axes 34 of the terminal convolutions 24, 26, intersect. Each of these angular offsets may be about 8° according to the type of wire employed or the degree of frictional holding desired. The purposes of these particular configurations will be more fully apparent hereinafter.

The line receiving or rotatable part of this reel structure comprises a shaft 36 provided with a crank 38 at one end thereof, the shaft being mounted in the convolutions 24, 26, which serves as bearings or journals therefor. When the shaft 36 is assembled in the journals, the convolutions 24, 26, are warped or twisted so that their axes 34 coincide with the axis 40 of the shaft 36 and such convolutions grip the shaft for holding the same against too free rotation or looseness and yet permit rotation of the shaft by its crank. The necessary force needed for the rotation being gauged by the character of wire employed and the free angular offset of the axes 34 of the convolutions.

The line receiving body is formed by two minor frame members each of general rectangular form shaped from continuous pieces of wire. One of these minor frames 42 is fixedly mounted on the shaft 36 by means of welds 44 intermediate the length of two of its opposing sides. The other minor frame member 46 is mounted on the shaft 36 by having a full turn or convolution 48, 50, in each of two of its opposing sides embrace the shaft between the welds 44.

In assembly, the distance along the shaft 36 between the welds 44 being less than the free width of the frame 46, the sides are slightly squeezed toward each other (Fig. V) and this frame member is consequently held by friction against the adjacent sides of the frame member 42. By the mounting employed, the frame member 46 may be manually rotated about the shaft 36 to any desired angular position from fully collapsed (Fig. III) to fully open (Fig. I).

The frame members 42, 46, may be shaped to provide line guides 52 at their outer extent.

Further frictional holding of the parts in assembly is due to the converging frame arms 20, 22, thrusting against the frame member 42 on the opposite side of the welds 44 from the frame member 46. The wire forming the convolutions 24, 26, is tapered at its termini to form flat or parallel faces 54, 56, to prevent any locking of the rotating parts thus insuring smooth action.

A satisfactory quick-action mounting lock for the device when used on a fishing rod is herein shown. A pair of springs 58 each have one end thereof attached to the arm 12 and their opposite ends attached to clip 60. The springs 58 together with the base 10 and one or more reinforcements 32 may embrace the fishing rod at a convenient place and so held by the clip 60 engaging the arm 14. Extension 62 from the clip may serve as a trigger by which said clip may be easily and quickly snapped into locked or unlocked position.

The construction disclosed is an efficient economical device, the main frame formed from a continuous length of flexible material such as wire and having an overall U-shape, with a reduced lower portion to serve as a grip or support engaging extension. The convolutions 24, 26, forming the bearings for the shaft 36 are originally fabricated to have their axes 34 extend along different or diverging lines and these coils are flexed into coaxial alignment by the insertion or mounting of the shaft 36 thereinto and thus the shaft is held against excess rotation by the coil forming bearings frictionally engaging the shaft. The nested inner and outer line receiving frame members, with the inner frame having its shaft embracing sides held under compression, also cooperate to form a simple device free from any looseness either in collapsed or set-up position. These latter minor frame members may also be formed from continuous lengths of suitable wire and the entire assembly may be completed by spot welds.

The wire parts may be made of stainless steel wire or of other desirable materials coated with a weather-proofing substance which also enhances the appearance. Plastic coatings may be employed, even contrasting colors. A suitable plastic coating may be particularly desirable for the line engaging portions of the reels upon which a fish line may be held for drying at a predetermined tension thus prolonging the line life.

What is claimed and it is desired to secure by United States Letters Patent:

1. A reel of the class described comprising a substantially U-shaped frame formed from a continuous length of flexible wire, said frame having a base and a pair of arms extending therefrom, said base having a central offset adapted to provide a handle for the frame, said arms each terminating in a series of inwardly extending convolutions, the convolutions of one arm formed about an axis extending in a different direction than the axis about which the convolutions are formed on the other arm, said convolutions providing a pair of spaced bearings which are shaped to be out of alignment, a shaft mounted in said bearings, said shaft warping and holding said bearings to have their axes coincide with the axis of said shaft and thereby frictionally grip said shaft to provide a predetermined resistance against free rotation of the shaft in said bearings, and a line receiving reel mounted on said shaft between said bearings.

2. The structure set forth in claim 1 wherein the wire extent forming the terminal convolution of each bearing is tapered whereby the opposing faces of the bearings are substantially parallel when mounting the shaft.

ORMOND K. ELDREDGE.

REFERENCES CITED

The following references are of record in the file of this patent:

UNITED STATES PATENTS

| Number | Name | Date |
|---|---|---|
| 987,411 | Spencer | Mar. 21, 1911 |
| 1,219,658 | Meyer | Mar. 20, 1917 |
| 1,286,085 | Peters | Nov. 26, 1918 |
| 2,084,251 | Haislip | June 15, 1937 |